United States Patent
Collett et al.

(10) Patent No.: US 9,487,086 B2
(45) Date of Patent: Nov. 8, 2016

(54) AUXILIARY MODULES MOUNTED ON A VEHICLE

(71) Applicant: Parker-Hannifin Corporation, Cleveland, OH (US)

(72) Inventors: Raymond E. Collett, Put in Bay, OH (US); Spiro Kattan, Brooklyn, NY (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/177,367

(22) Filed: Feb. 11, 2014

(65) Prior Publication Data

US 2014/0291045 A1    Oct. 2, 2014

Related U.S. Application Data

(60) Provisional application No. 61/807,435, filed on Apr. 2, 2013.

(51) Int. Cl.
    *B60K 25/06*    (2006.01)

(52) U.S. Cl.
    CPC ......... *B60K 25/06* (2013.01); *B60K 2025/065* (2013.01); *Y10T 29/49826* (2015.01)

(58) Field of Classification Search
    CPC ........ H02K 7/18; H02K 7/1807; H02P 9/06; H02P 9/00; F02B 63/00; F02B 63/04; F02B 63/06; B60K 2025/026; B60K 25/00; B60K 25/06; A01B 71/00; A01B 71/06; E02F 9/0858; B60P 3/14

USPC .................................. 290/40 R; 180/53.4
    See application file for complete search history.

(56) References Cited

U.S. PATENT DOCUMENTS

| | | | |
|---|---|---|---|
| 5,074,373 A * | 12/1991 | Schmidt ................. | 180/305 |
| 5,332,053 A * | 7/1994 | Vachon .................. | 180/53.4 |
| 7,053,498 B1 | 5/2006 | Boisvert et al. | |
| 7,459,800 B2 | 12/2008 | Boisvert et al. | |
| 7,759,811 B2 * | 7/2010 | Boisvert et al. ............ | 290/43 |
| 8,269,359 B2 | 9/2012 | Boisvert et al. | |
| 8,269,360 B2 | 9/2012 | Boisvert et al. | |
| 8,276,831 B2 * | 10/2012 | Rutherford ............ | 239/172 |
| 2011/0226539 A1 * | 9/2011 | Huss et al. ............ | 180/65.21 |
| 2014/0225374 A1 * | 8/2014 | Collett et al. ............ | 290/1 A |

* cited by examiner

*Primary Examiner* — Paul N Dickson
*Assistant Examiner* — Timothy Wilhelm
(74) *Attorney, Agent, or Firm* — Renner, Otto, Boisselle & Sklar, LLP

(57) ABSTRACT

Provided is an auxiliary power module removably connectable to a mobile platform, such as a municipal vehicle having a prime mover mounted thereon for powering the auxiliary power module. The auxiliary power module includes a connector configured to be fluidly connected to a connector on the vehicle, a hydraulic motor fluidly connected to the connector through a hydraulic circuit, and an auxiliary device, such as a generator, mechanically driven by the hydraulic motor. When the auxiliary power module is connected to the municipal vehicle, the existing vehicle hydraulic circuit may be used with the auxiliary power module to provide output power from the generator during emergency and disaster situations.

16 Claims, 7 Drawing Sheets

AUXILIARY MODULES MOUNTED ON A VEHICLE

RELATED APPLICATIONS

This application claims the benefit of U.S. Provisional Application No. 61/807,435 filed Apr. 2, 2013, which is hereby incorporated herein by reference.

FIELD OF INVENTION

The present invention relates generally to municipal vehicles, and more particularly to auxiliary modules mounted to vocational vehicles such as refuse, salt and sand, landscaping, and utility.

BACKGROUND

Power take-off units are mechanical devices that are used in conjunction with sources of rotational energy, such as vehicle engines and transmissions, for selectively providing power to one or more rotatably driven accessories. For example, power take-off units are commonly used in a variety of industrial and agricultural vehicles for operating hydraulic pumps that, in turn, operate hydraulically driven accessories, such as plows, trash compactors, lifting mechanisms, winches, and the like. Power take-off units may also be used to connect the vehicle engines and transmission to an auxiliary device, such as a generator.

SUMMARY OF INVENTION

The present invention provides an auxiliary power module removably connectable to a mobile platform, such as a municipal vehicle having a prime mover mounted thereon for powering the auxiliary power module. The auxiliary power module includes a connector configured to be fluidly connected to a connector on the vehicle, a hydraulic motor fluidly connected to the connector through a hydraulic circuit, and an auxiliary device, such as a generator, mechanically driven by the hydraulic motor. When the auxiliary power module is connected to the municipal vehicle, the existing vehicle hydraulic circuit may be used with the auxiliary power module to provide output power from the generator during emergency and disaster situations.

According to one aspect of the invention, a power source is provided that includes a prime mover mounted on a mobile platform, a hydraulic pump driven by the prime mover, a first connector fluidly connected to the hydraulic pump through a hydraulic circuit, and an auxiliary power module removably connected to the mobile platform, the auxiliary power module including a second connector configured to be fluidly connected to the first connector, a hydraulic motor fluidly connected to the second connector through a hydraulic circuit, and an auxiliary device mechanically driven by the hydraulic motor, wherein the hydraulic pump is fluidly connected to the hydraulic motor when the first and second connectors are fluidly connected.

The mobile platform may include a compartment for removably receiving the auxiliary power module.

The power source may further include a locking mechanism securing the auxiliary power module in the compartment to prevent the auxiliary power module from being disconnected.

The locking mechanism may include one or more rods or cables extending across an opening of the compartment through which the auxiliary power module is received.

The auxiliary device may be a generator, sump pump, vacuum pump, welder, or emergency lighting.

The power source may further include an electrical connector and an electric power line electrically connecting the electrical connector to the auxiliary device to output electrical power.

The power source may further include a snow plow mount mounted on a front of the mobile platform and connected to the auxiliary power module.

The power source may further include a fluid conduit having a first end connected to the first fluid connector and a second end connected to the second fluid connector to fluidly connect the first and second fluid connectors.

The power source may further include hydraulically operated front loader arms mounted on a front of the mobile platform, wherein the front loader arms are configured to support the auxiliary power module.

The auxiliary power module may be mounted on a rear of the mobile platform.

The power source may further include a fluid conduit having a first end connected to the first fluid connector and a second end connected to the second fluid connector to fluidly connect the first and second fluid connectors.

The power source may further include a body hydraulic on the mobile platform which is driven by the hydraulic pump.

The power source may further include a power take-off connected to the prime mover and connectable to the hydraulic pump to transfer power from the prime mover to the hydraulic pump.

The power source may further include a transmission for transferring power from the prime mover and a power take-off connected to the transmission and connectable to the hydraulic pump to transfer the power to the hydraulic pump.

According to another aspect of the invention, a vehicle is provided that includes a body including a compartment for removably receiving a hydraulically powered auxiliary power module, a prime mover, a hydraulic pump driven by the prime mover, and a connector fluidly connected to the hydraulic pump through a hydraulic circuit, the connector being in a vicinity of the compartment for removably fluidly connecting the auxiliary power module to the hydraulic pump.

The vehicle may be in combination with an auxiliary power module that may include a connector configured to be fluidly connected to the connector on the vehicle, a hydraulic motor fluidly connected to the connector through a hydraulic circuit, and an auxiliary device mechanically driven by the hydraulic motor, wherein the hydraulic pump is fluidly connected to the hydraulic motor when the connectors are fluidly connected.

The auxiliary power module may be received in the compartment.

The combination may include a locking mechanism securing the auxiliary power module in the compartment to prevent the auxiliary power module from being disconnected.

According to still another aspect of the invention, a method is provided for mounting an auxiliary power module to a vehicle The auxiliary power module may include a first fluid connector, a hydraulic motor fluidly connected to the fluid connector through a hydraulic circuit, and an auxiliary device mechanically driven by the hydraulic motor. The vehicle may include a body including a compartment, a prime mover, a hydraulic pump driven by the prime mover, and a second fluid connector fluidly connected to the hydraulic pump through a hydraulic circuit. The method includes inserting the auxiliary power module into the compartment in the body of the vehicle, and connecting the first fluid connector to the second fluid connector to fluidly connect the hydraulic pump to the hydraulic motor.

Connecting the first and second fluid connectors may include connecting a first end of a fluid conduit to the first fluid connector and connecting a second end of the fluid conduit to the second fluid connector to fluidly connect the first and second fluid connectors.

The foregoing and other features of the invention are hereinafter described in greater detail with reference to the accompanying drawings.

DETAILED DESCRIPTION

The principles of the present invention have particular application to auxiliary power devices, such as generators that utilize hydraulic or electric power on a vehicle, such as a municipal vehicle, and thus will be described below chiefly in this context. It will of course be appreciated, and also understood, that the principles of the invention may be useful in other applications where auxiliary power is provided.

Figure 1:
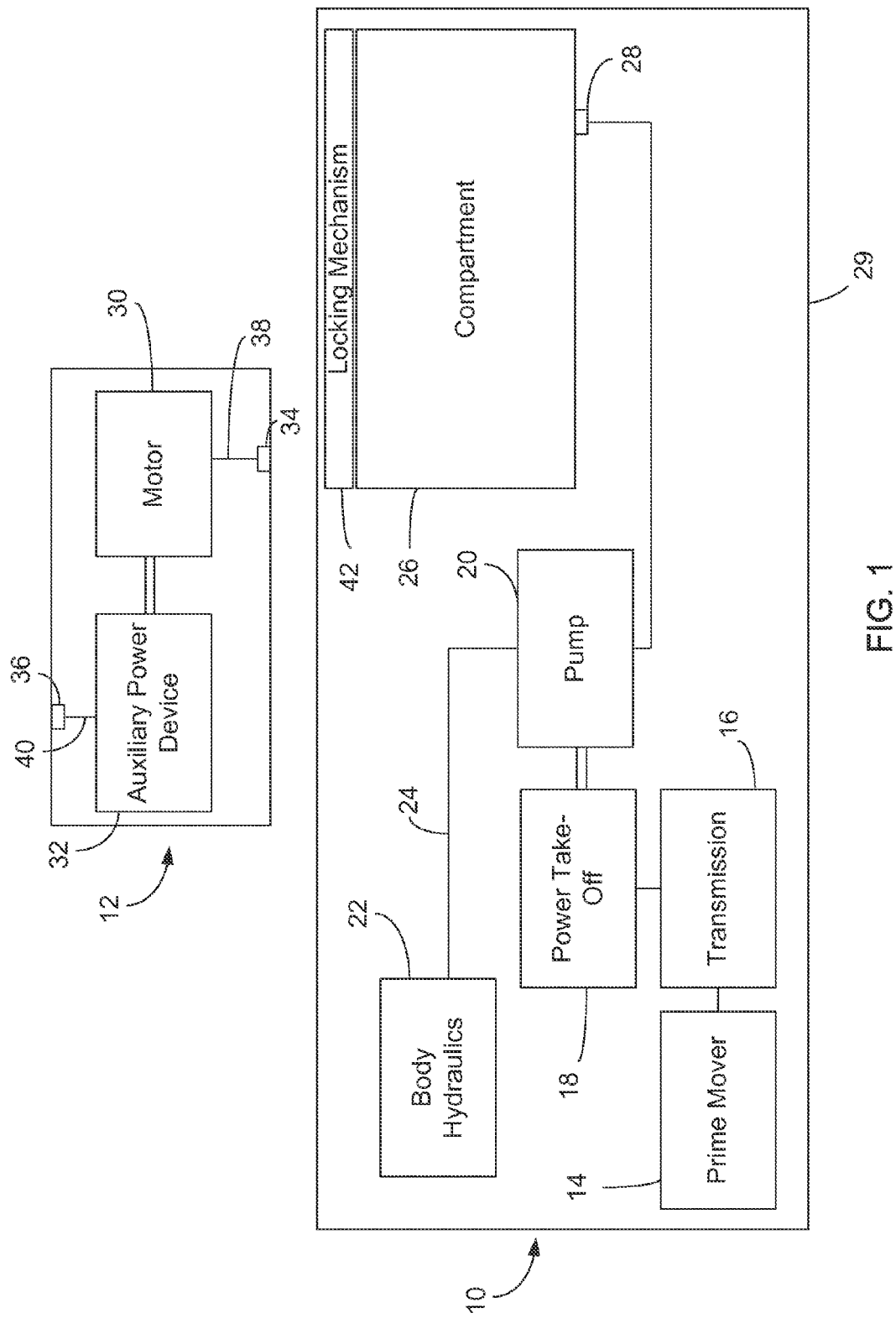
FIG. 1 is a schematic diagram of a vehicle having a compartment and an exemplary auxiliary power module according to the invention.

Turning now in detail to the drawings and initially to FIG. 1, a mobile platform 10, such as a vehicle, such as a municipal refuse vehicle is shown. The vehicle 10 is connectable to an auxiliary power module 12 and includes a prime mover 14, such as an engine or electric motor, a transmission 16 for transferring power from the prime mover 14, a power take-off 18 connected to the transmission 16, and a hydraulic pump 20, such as a gear pump, a vane pump, a piston pump, etc. that is driven by energy from the prime mover 14 through the transmission 16 and power take-off 18. The vehicle also includes one or more body hydraulics 22, such as a refuse compactor on a municipal refuse vehicle, which is fluidly connected to the hydraulic pump 20 through a body hydraulics circuit 24, and a vehicle body 29 for supporting the above components. It will be appreciated that the power take-off 18 may be a prime mover driven power take-off rather than a transmission driven power take-off, or the prime mover 14 may directly transfer power to the hydraulic pump 20.

The vehicle 10 also includes a compartment 26 in the body 29 for receiving the auxiliary power module 12. The compartment may be located at any suitable location on the vehicle, such as on a side of the vehicle, such as on a passenger or curbside of a municipal refuse vehicle. A fluid connector 28 may extend into the compartment 26 or be secured to a wall of the compartment 26. The fluid connector 28 may be any suitable connector, such as a quick connect coupler, threaded coupler, etc., and may be fluidly connected to the hydraulic pump 20 through the body hydraulics circuit 24. The fluid connector 28 is configured to mate with a corresponding connector on the auxiliary power module 12 to fluidly connect the hydraulic pump 20 to the auxiliary power module 12.

The auxiliary power module 12 includes a hydraulic motor 30, an auxiliary power device 32, such as a generator, sump pump, vacuum pump, welder, emergency lighting or other element mechanically driven by the hydraulic motor 30, a fluid connector 34 for mating with the fluid connector 28, and an electrical connector 36 for connecting to an external electrical device. The hydraulic motor 30 is fluidly connected to the fluid connector 34 through an auxiliary hydraulics circuit 38, and the electrical connector 36 is electrically connected to the auxiliary power device 32 through one or more electric power lines 40. The connector 34 may be any suitable connector, such as a quick connect coupler, threaded coupler, etc.

Figure 2:
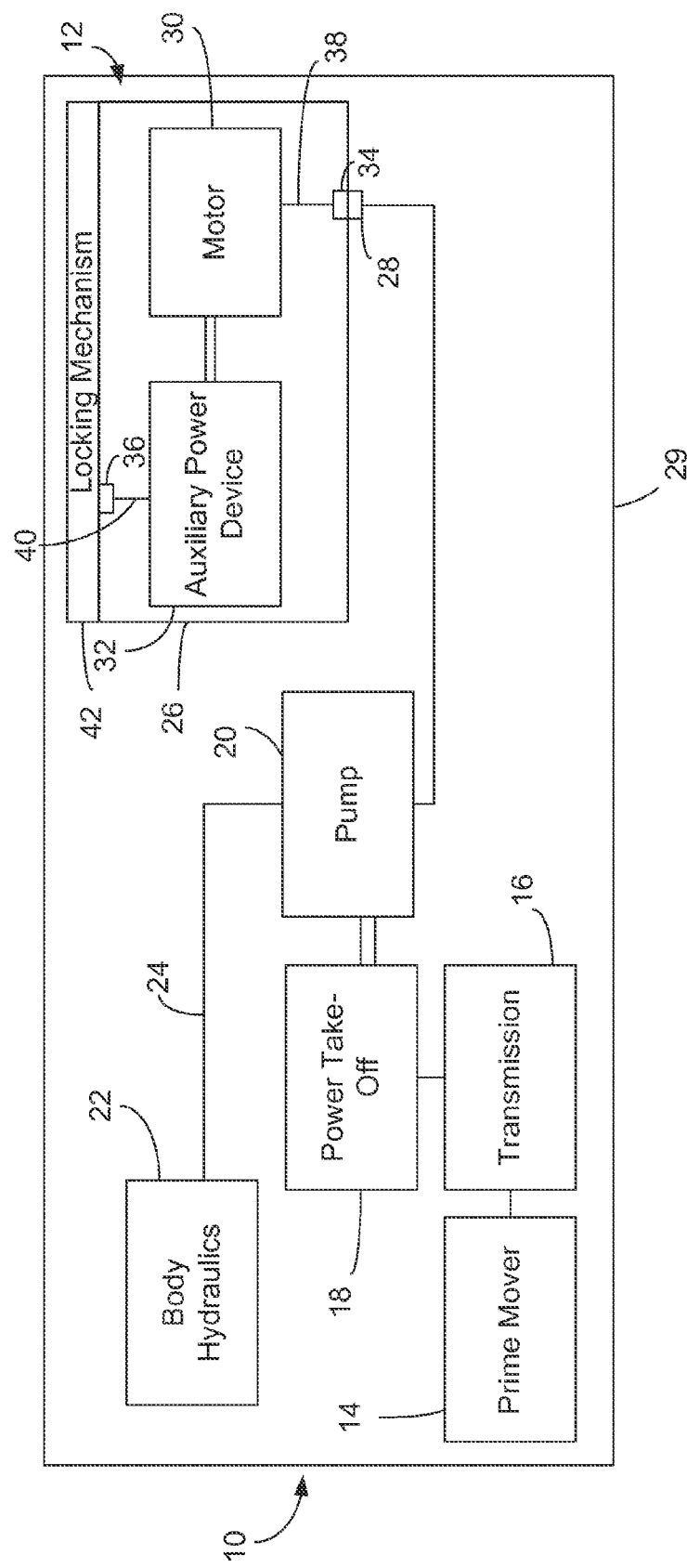
FIG. 2 is a schematic diagram of the auxiliary power module mounted in the compartment.

Turning now to FIG. 2, the auxiliary power module 12 is shown disposed in the compartment 26 of the vehicle 10. The auxiliary power module 12 may be held in the compartment by a locking mechanism 42 to prevent the auxiliary power module 12 from being disconnected from the vehicle 10, for example during transit. The locking mechanism 42 may be any suitable locking mechanism, such as one or more rods or one or more cables covering the opening into the compartment 26, a slide mount with lock assembly, such as a spring lock assembly, that would allow the auxiliary power module to be slid into and out of the compartment 26 and locked in the compartment 26, etc. The locking mechanism 42 and connectors 28 and 34 allow for rapid interchange of auxiliary power modules.

When the auxiliary power module 12 is disposed in the compartment 26, the connector 34 may be connected to the connector 28 to fluidly connect the hydraulic pump 20 to the hydraulic motor 30. Once connected, hydraulic fluid can flow from the hydraulic pump 20 through the body hydraulics circuit 24, through the connectors 28 and 34 to the auxiliary hydraulics circuit 38, and then through the auxiliary hydraulics circuit 38 to the hydraulic motor 30. Alternatively, the connectors 28 and 34 may be connected to opposite ends of a fluid conduit as shown in FIG. 4, which may allow the auxiliary power module 12 to be fluidly connected to the hydraulic pump 20 prior to being positioned in the compartment 26.

During normal operation or during emergency and disaster situations, the hydraulic pump 20 can be fluidly connected to the hydraulic motor 30 to provide output power using the existing body hydraulics circuit 24 and pump 20. The hydraulic pump 20 is driven by energy from the prime mover 14 to pressurize the hydraulic fluid entering the hydraulic motor 30. The hydraulic motor 30 converts the hydraulic energy into mechanical energy to drive the auxiliary power device 32. The auxiliary power device 32 then outputs electrical energy through the electric power line 40 to deliver electricity to an external device electrically connected to the connector 36. By connecting the auxiliary hydraulic module 12 to a municipal vehicle, such as a refuse truck, the single purpose municipal vehicle may be utilized during an emergency or disaster situation when the vehicle otherwise would have no use.

Figure 3:
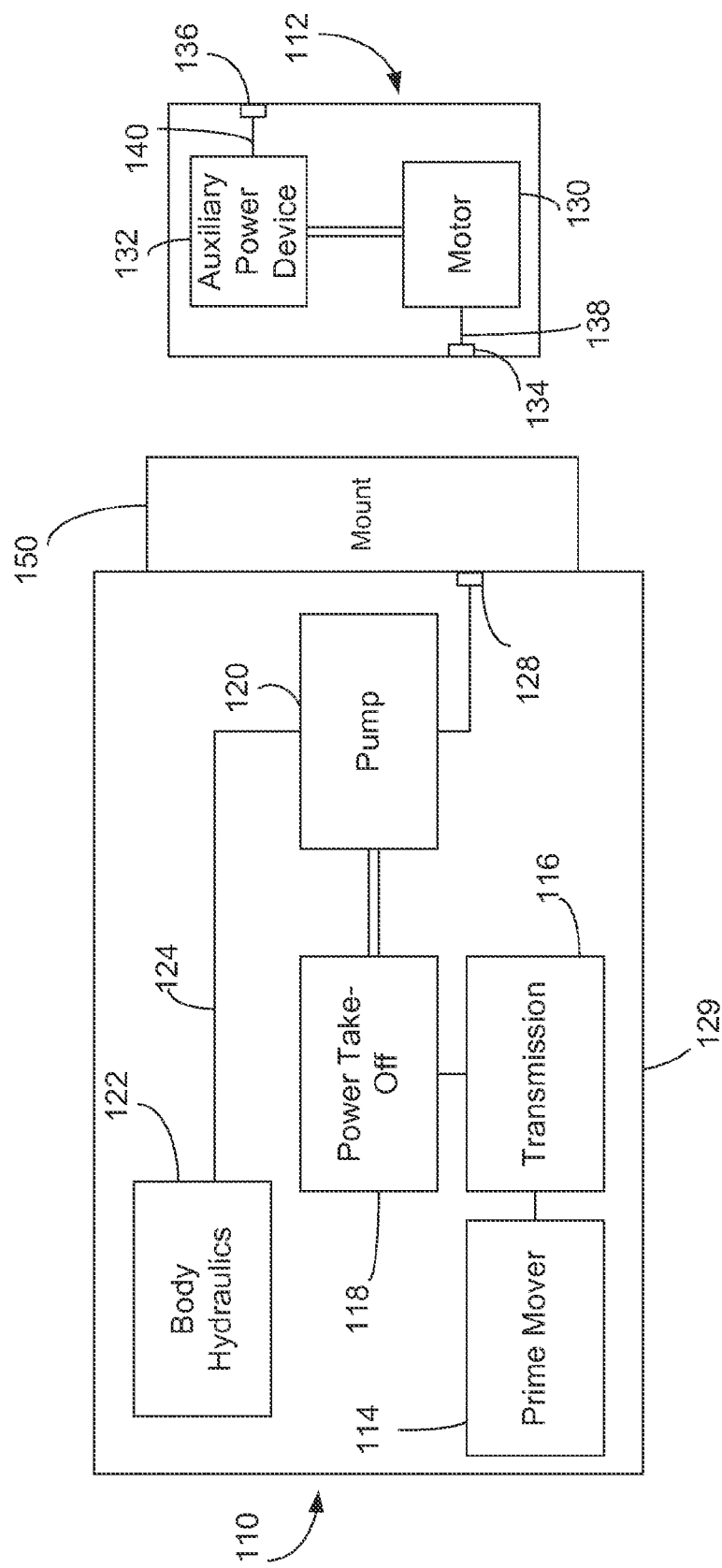
FIG. 3 is another schematic diagram of a vehicle having a snow plow mount and exemplary auxiliary power module.
Figure 4:
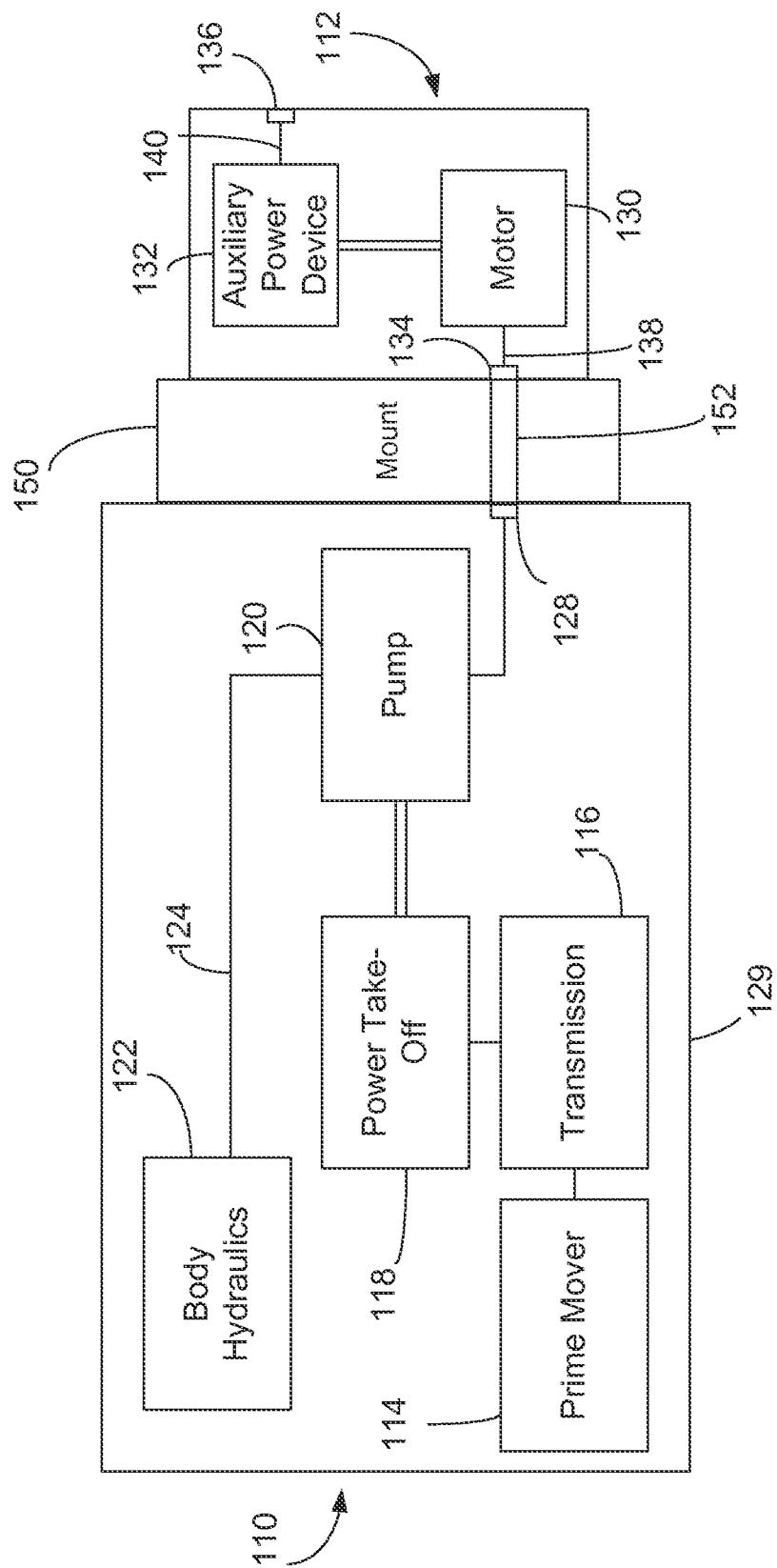
FIG. 4 is a schematic diagram of the auxiliary power module of FIG. 3 mounted to the snow plow mount.

Turning now to FIGS. 3 and 4, an exemplary embodiment of the vehicle and auxiliary power module is shown. The vehicle 110 and auxiliary power module 112 are substantially the same as the above-referenced vehicle 10 and auxiliary power module 12, and consequently the same reference numerals but indexed by 100 are used to denote structures corresponding to similar structures in the vehicle and auxiliary power module. In addition, the foregoing description of the vehicle 10 and auxiliary power module 12 is equally applicable to the vehicle 110 and auxiliary power module 112 except as noted below. Moreover, it will be appreciated upon reading and understanding the specification that aspects of the vehicles and auxiliary power modules may be substituted for one another or used in conjunction with one another where applicable.

Referring now to FIG. 3, the vehicle 110 includes the prime mover 114, the transmission 116, the power take-off 118, the hydraulic pump 120, the body hydraulics 122, the body hydraulics circuit 124, the fluid connector 128, and the vehicle body 129. The vehicle 110 also includes a mount 150, such as a snow plow mount coupled to a front of the vehicle 110 in any suitable manner. The snow plow mount may include a hydraulic circuit or be connected to the body hydraulics circuit 124. The auxiliary power module 112 includes the hydraulic motor 130, the auxiliary power device 132, the fluid connector 134, the electrical connector 136, the auxiliary hydraulics circuit 138, and the one or more electric power lines 140.

Referring now to FIG. 4, the auxiliary power module 112 is shown mounted to the snow plow mount 150. The auxiliary power module 112 may be mounted to the snow plow mount 150 in any suitable manner, such as by a mounting assembly coupled to both the auxiliary power module 112 and the snow plow mount 150. The connection between the snow plow mount 150 and the auxiliary power module 112 and the connectors 128 and 134 allow for rapid interchange of auxiliary power modules.

When the auxiliary power module 112 is mounted to the snow plow mount 150, the fluid connector 128 may be connected to one end of a fluid conduit 152, such as by a quick connect connection or threaded connection, and the fluid connector 134 may be connected to the other end of the fluid conduit 152, such as by a quick connect connection or threaded connection, to fluidly connect the hydraulic pump 120 to the hydraulic motor 130. The fluid can flow from the hydraulic pump 120 through the body hydraulics circuit 124, through the connector 128, fluid conduit 152, and connector 134 to the auxiliary hydraulics circuit 138, and then through the auxiliary hydraulics circuit 138 to the hydraulic motor 130. The fluid conduit may be any suitable conduit, such as a flexible hose, a tube, etc. Alternatively, it will be appreciated that the connectors 128 and 134 may be coupled together as shown in FIG. 2.

Figure 5:
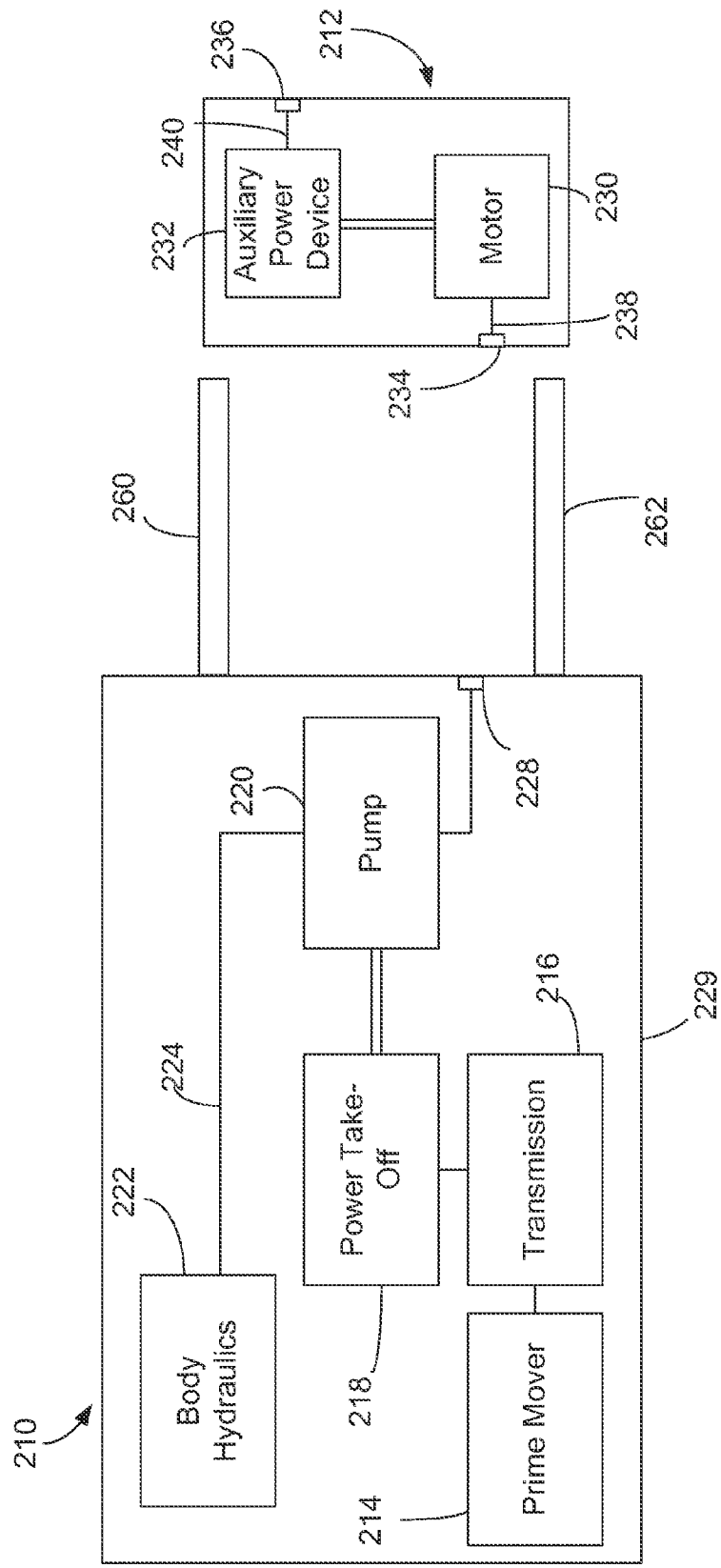
FIG. 5 is still another schematic diagram of a vehicle having front loader arms and exemplary auxiliary power module.
Figure 6:
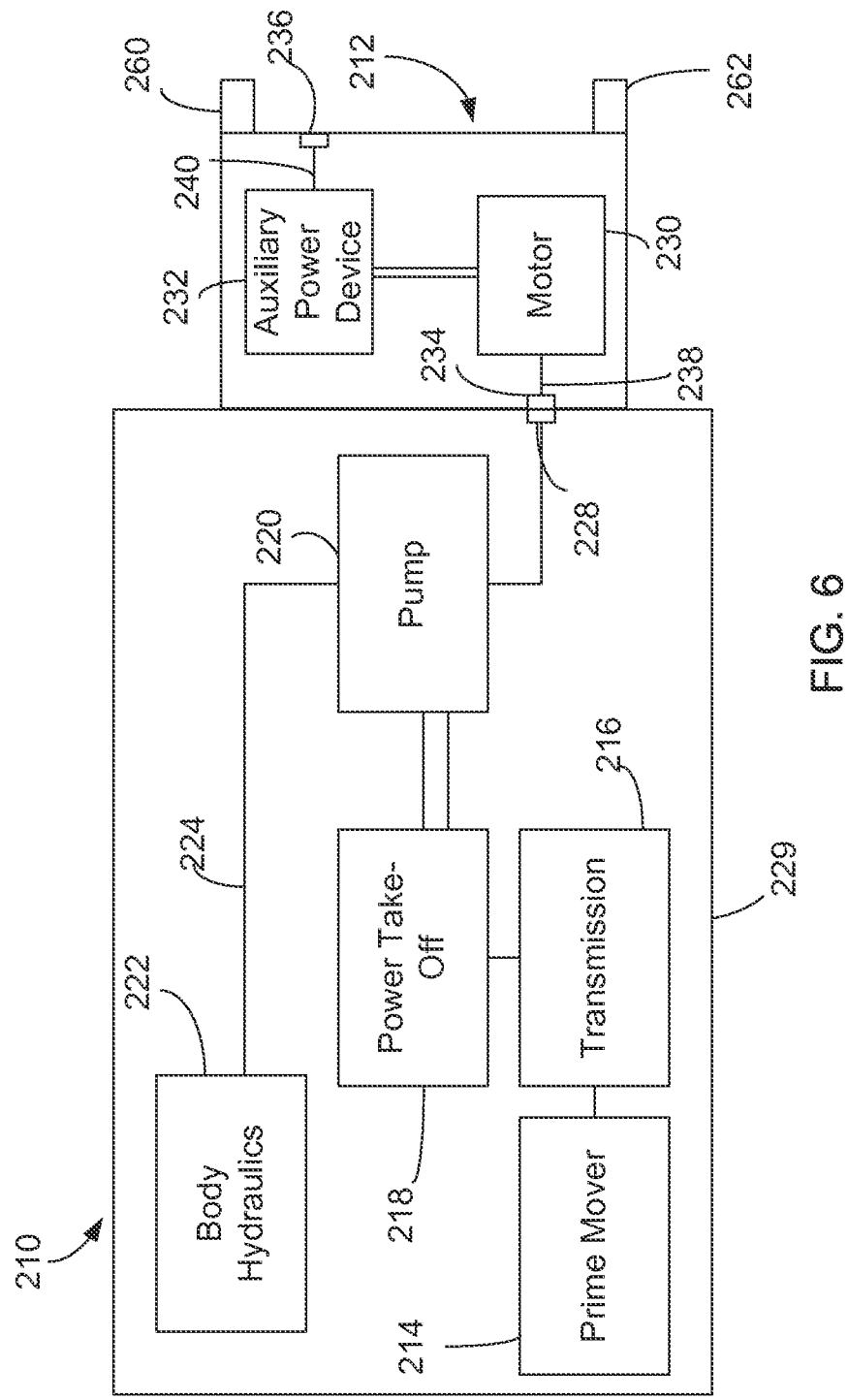
FIG. 6 is a schematic diagram of the auxiliary power module of FIG. 5 supported by the front loader arms.

Turning now to FIGS. 5 and 6, an exemplary embodiment of the vehicle and auxiliary power module is shown. The vehicle 210 and auxiliary power module 212 are substantially the same as the above-referenced vehicle 10 and auxiliary power module 12, and consequently the same reference numerals but indexed by 200 are used to denote structures corresponding to similar structures in the vehicle and auxiliary power module. In addition, the foregoing description of the vehicle 10 and auxiliary power module 12 is equally applicable to the vehicle 210 and auxiliary power module 212 except as noted below. Moreover, it will be appreciated upon reading and understanding the specification that aspects of the vehicles and auxiliary power modules may be substituted for one another or used in conjunction with one another where applicable.

Referring now to FIG. 5, the vehicle 210 includes the prime mover 214, the transmission 216, the power take-off 218, the hydraulic pump 220, the body hydraulics 222, the body hydraulics circuit 224, the fluid connector 228, and the vehicle body 229. The vehicle 210 may also include front loader arms 260 and 262 coupled to a front of the vehicle 210 in any suitable manner. The front loader arms 260 and 262 are configured to move up and down, for example by hydraulic power from the body hydraulics circuit 224 or a separate hydraulics circuit, or by electrical power. The auxiliary power module 212 includes the hydraulic motor 230, the auxiliary power device 232, the fluid connector 234, the electrical connector 236, the auxiliary hydraulics circuit 238, and the one or more electric power lines 240.

Referring now to FIG. 6, the auxiliary power module 212 is shown supported on the front loader arms 260 and 262. The bottom of the auxiliary power module 212 may be positioned on the arms 260 and 262 or the auxiliary power module 212 may have openings at the bottom through which the front loader arms 260 and 262 may extend, for example. The auxiliary power module 212 may be coupled to the front loader arms 260 and 262 and/or the vehicle 210 in any suitable manner, such as by straps, fasteners, or mounting brackets with integrated fix points for connectivity to prevent disconnection. The connection between the front loader arms 260 and 262 and/or the vehicle 210 and the auxiliary power module 112 and the connectors 228 and 234 allow for rapid interchange of auxiliary power modules.

When the auxiliary power module 212 is mounted to vehicle 210, the fluid connector 234 may be connected to the fluid connector 228 to fluidly connect the hydraulic pump 220 to the hydraulic motor 230. The fluid can flow from the hydraulic pump 220 through the body hydraulics circuit 224, through the connectors 228 and 234 to the auxiliary hydraulics circuit 238, and then through the auxiliary hydraulics circuit 238 to the hydraulic motor 230. Alternatively, the connectors 228 and 234 may be connected to opposite ends of the fluid conduit as shown in FIG. 4.

Figure 7:
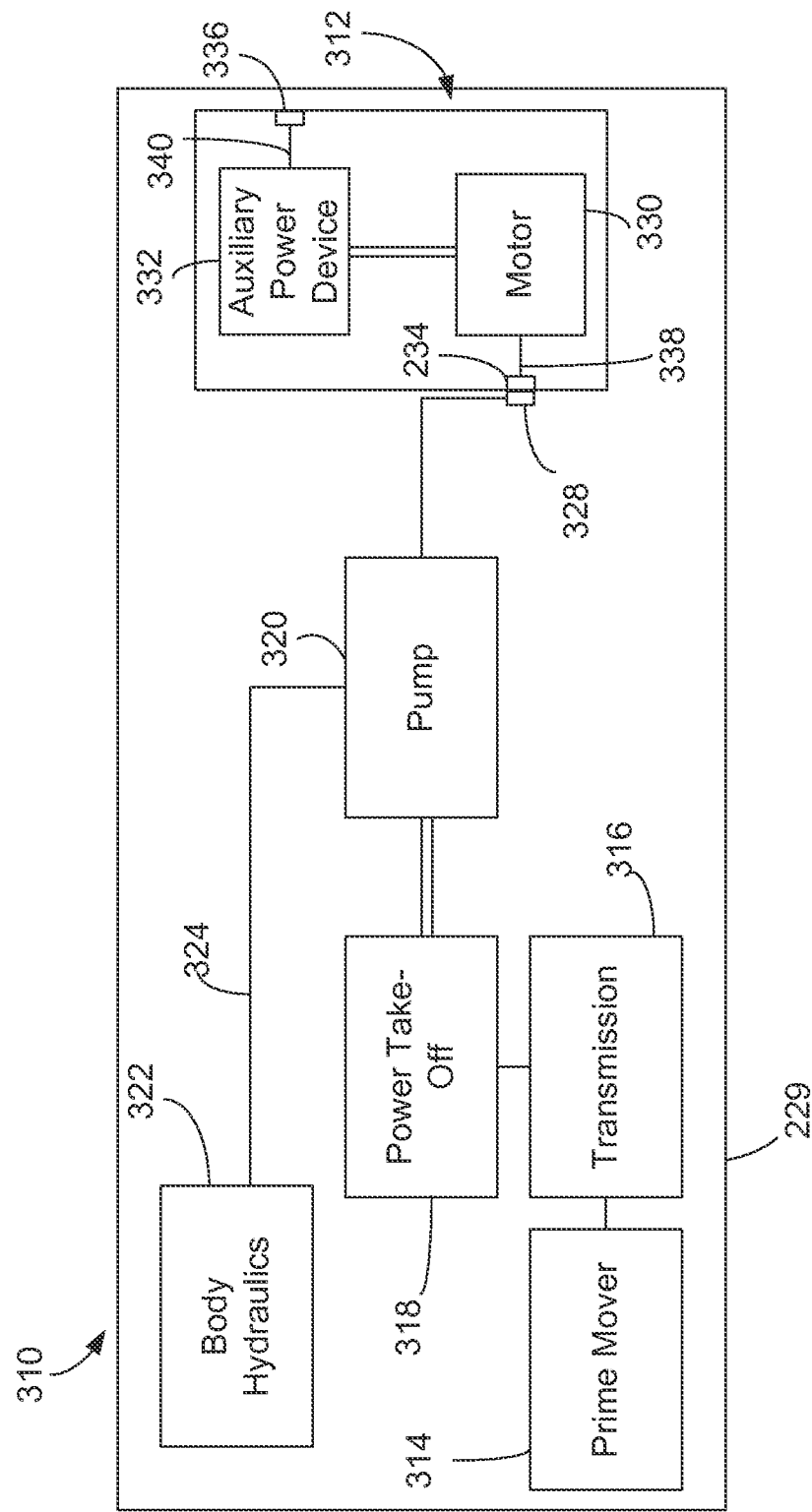
FIG. 7 is another schematic diagram of a vehicle and an exemplary auxiliary power module mounted in a rear of the vehicle.

Turning now to FIG. 7, an exemplary embodiment of the vehicle and auxiliary power module is shown. The vehicle 310 and auxiliary power module 312 are substantially the same as the above-referenced vehicle 10 and auxiliary power module 12, and consequently the same reference numerals but indexed by 300 are used to denote structures corresponding to similar structures in the vehicle and auxiliary power module. In addition, the foregoing description of the vehicle 10 and auxiliary power module 12 is equally applicable to the vehicle 310 and auxiliary power module 312 except as noted below. Moreover, it will be appreciated upon reading and understanding the specification that aspects of the vehicles and auxiliary power modules may be substituted for one another or used in conjunction with one another where applicable.

Referring now to FIG. 7, the vehicle 310 includes the prime mover 314, the transmission 316, the power take-off 318, the hydraulic pump 320, the body hydraulics 322, the body hydraulics circuit 324, the fluid connector 328, and the vehicle body 329. The auxiliary power module 312 includes the hydraulic motor 330, the auxiliary power device 332, the fluid connector 334, the electrical connector 336, the auxiliary hydraulics circuit 338, and the one or more electric power lines 340. The auxiliary power module 312 is shown mounted on a rear of the vehicle 310, for example in the rear of a refuse truck. The auxiliary power module 312 may be secured in the rear of the vehicle 310 in any suitable manner, such as by straps, fasteners, a slide mount with locking mechanism, etc.

When the auxiliary power module 312 is mounted to vehicle 310, the connector 334 may be connected to the connector 328 to fluidly connect the hydraulic pump 320 to the hydraulic motor 330. The fluid can flow from the hydraulic pump 320 through the body hydraulics circuit 324, through the connectors 328 and 334 to the auxiliary hydraulics circuit 338, and then through the auxiliary hydraulics circuit 338 to the hydraulic motor 330. Alternatively, the connectors 328 and 334 may be connected to opposite ends of the fluid conduit as shown in FIG. 4.

It will be appreciated that any of the above described vehicles 10, 110, 210, or 310 may include more than one connector 28, 128, 228, or 328 fluidly connected to the respective pump 20, 120, 220, or 320 for connecting the vehicles to a plurality of auxiliary power modules. It will also be appreciated that an auxiliary power device may be provided that is powered off of an electrical hybrid drivetrain.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A power source including:
   a prime mover mounted on a mobile platform;
   a hydraulic pump driven by the prime mover;
   a first connector fluidly connected to the hydraulic pump through a hydraulic circuit;
   an auxiliary power module removably connected to the mobile platform, the auxiliary power module including:
      a second connector configured to be fluidly connected to the first connector;
      a hydraulic motor fluidly connected to the second connector through a hydraulic circuit; and
      an auxiliary device mechanically driven by the hydraulic motor, wherein the auxiliary device is a generator, sump pump, vacuum pump, welder, or emergency lighting; and
   a snow plow mount mounted on a front of the mobile platform and connected to the auxiliary power module, wherein the hydraulic pump is fluidly connected to the hydraulic motor when the first and second connectors are fluidly connected.

2. The power source according to claim 1, further including an electrical connector and an electric power line electrically connecting the electrical connector to the auxiliary device to output electrical power.

3. The power source according to claim 1, further including a fluid conduit having a first end connected to the first fluid connector and a second end connected to the second fluid connector to fluidly connect the first and second fluid connectors.

4. The power source according to claim 1, further including a body hydraulic on the mobile platform which is driven by the hydraulic pump.

5. The power source according to claim 1, further including a power take-off connected to the prime mover and connectable to the hydraulic pump to transfer power from the prime mover to the hydraulic pump.

6. The power source according to claim 1, further including a transmission for transferring power from the prime mover and a power take-off connected to the transmission and connectable to the hydraulic pump to transfer the power to the hydraulic pump.

7. A vehicle including:
   a body including a compartment for removably receiving a hydraulically powered auxiliary power module;
   a prime mover;
   a hydraulic pump driven by the prime mover; and
   a connector fluidly connected to the hydraulic pump through a hydraulic circuit, the connector being in a vicinity of the compartment for removably fluidly connecting the auxiliary power module to the hydraulic pump;
   wherein the auxiliary power module is slidable into and out of the compartment for rapid interchange of auxiliary power modules.

8. The vehicle according to claim 7 in combination with the auxiliary power module, the auxiliary power module including a connector configured to be fluidly connected to the connector on the vehicle, a hydraulic motor fluidly connected to the connector through a hydraulic circuit, and an auxiliary device mechanically driven by the hydraulic motor, wherein the hydraulic pump is fluidly connected to the hydraulic motor when the connectors are fluidly connected.

9. The combination according to claim 8, wherein the auxiliary power module is received in the compartment.

10. The combination according to claim 9, further including a locking mechanism securing the auxiliary power module in the compartment to prevent the auxiliary power module from being disconnected.

11. The vehicle according to claim 10, wherein the locking mechanism includes one or more rods or cables extending across an opening of the compartment through which the auxiliary power module is received.

12. The vehicle according to claim 7, wherein the compartment is on a side of the vehicle.

13. A method for mounting an auxiliary power module to a vehicle, the auxiliary power module including a first fluid connector, a hydraulic motor fluidly connected to the fluid connector through a hydraulic circuit, and an auxiliary device mechanically driven by the hydraulic motor, and the vehicle including a body including a compartment for removably receiving the auxiliary power module wherein the auxiliary power module is slidable into and out of the compartment for rapid interchange of auxiliary power modules, a prime mover, a hydraulic pump driven by the prime mover, and a second fluid connector fluidly connected to the hydraulic pump through a hydraulic circuit, the method including:
   inserting the auxiliary power module into the compartment in the body of the vehicle; and connecting the first fluid connector to the second fluid connector to fluidly connect the hydraulic pump to the hydraulic motor.

14. The method according to claim 13, wherein connecting the first and second fluid connectors includes connecting a first end of a fluid conduit to the first fluid connector and connecting a second end of the fluid conduit to the second fluid connector to fluidly connect the first and second fluid connectors.

15. The method according to claim 13, further including securing the auxiliary power module in the compartment via a locking mechanism to prevent disconnection of the auxiliary power module.

16. The method according to claim 15, wherein the locking mechanism includes one or more rods or cables extending across an opening of the compartment through which the auxiliary power module is received.

\* \* \* \* \*